United States Patent
Xiao et al.

(10) Patent No.: US 8,817,720 B2
(45) Date of Patent: Aug. 26, 2014

(54) METHOD AND DEVICE FOR DETERMINING SUBBAND INDEX

(75) Inventors: Shaoning Xiao, Shenzhen (CN); Xiaoming Su, Shenzhen (CN)

(73) Assignee: ZTE Corporation, Shenzhen (CN)

(*) Notice: Subject to any disclaimer, the term of this patent is extended or adjusted under 35 U.S.C. 154(b) by 558 days.

(21) Appl. No.: 13/258,365

(22) PCT Filed: May 7, 2010

(86) PCT No.: PCT/CN2010/072533
§ 371 (c)(1), (2), (4) Date: Oct. 28, 2011

(87) PCT Pub. No.: WO2010/145345
PCT Pub. Date: Dec. 23, 2010

(65) Prior Publication Data
US 2012/0087320 A1 Apr. 12, 2012

(30) Foreign Application Priority Data
Jun. 29, 2009 (CN) .......................... 2009 1 0088426

(51) Int. Cl.
H04W 4/00 (2009.01)
G01R 31/08 (2006.01)
H04W 72/00 (2009.01)
H04L 5/00 (2006.01)

(52) U.S. Cl.
CPC .............. H04W 72/00 (2013.01); H04L 5/0007 (2013.01)
USPC .......................................... 370/329; 370/252

(58) Field of Classification Search
None
See application file for complete search history.

(56) References Cited

U.S. PATENT DOCUMENTS

2009/0154588 A1 6/2009 Chen et al.
2009/0196190 A1 8/2009 Li et al.
2010/0272043 A1* 10/2010 Cho et al. ..................... 370/329
2011/0299626 A1* 12/2011 Kim et al. ..................... 375/295

FOREIGN PATENT DOCUMENTS

CN 1988454 A 6/2007
CN 101340697 A 1/2009
(Continued)

OTHER PUBLICATIONS

International Search Report in international application No. PCT/CN2010/072533, mailed on Aug. 12, 2010.
(Continued)

Primary Examiner — Michael J Moore, Jr.
Assistant Examiner — Hicham Foud
(74) Attorney, Agent, or Firm — Oppedahl Patent Law Firm LLC (57) ABSTRACT

The present invention discloses a method for determining a subband index, the method comprises: an Evolved Node B (eNB) receives r, calculates a difference between the received r and a formula

$$\binom{N-s_i}{M-i}$$

corresponding to each obtained subband index, searches sequences $$\binom{N-1}{M-i}, \binom{N-2}{M-i}, \ldots, \binom{0}{M-i}$$

in a stored intermediate value table according to the calculated difference to obtain each $s_i$ constituting $\{s_i\}_{i=0}^{M-1}$. The present invention further discloses a device for determining a subband index, the device comprises a table generation module, a receiving module and a calculation module. The method and device disclosed in the present invention are capable of reducing the storage space needed for a subband index report.

16 Claims, 2 Drawing Sheets

(56) References Cited

FOREIGN PATENT DOCUMENTS

| KR | 1020050003831 A | 1/2005 |
|----|-----------------|--------|
| KR | 1020060048938 A | 5/2006 |
| KR | 1020060075382 A | 7/2006 |
| KR | 1020070019755 A | 2/2007 |

OTHER PUBLICATIONS

English Translation of the Written Opinion of the International Search Authority in international application number: PCT/CN2010/072533, mailed on Aug. 12, 2010.

* cited by examiner

METHOD AND DEVICE FOR DETERMINING SUBBAND INDEX

TECHNICAL FIELD

The present invention relates to a long term evolution (LTE) technology, particularly to a method and device for determining a subband index.

BACKGROUND

In a third generation partnership project LTE (3GPP LTE) system, a mobile terminal can use a physical uplink shared channel (PUSCH) to report a channel quality indicator (CQI) non-periodically. The non-periodical report consists of three kinds of mode: a wideband mode, a mobile terminal selection mode and a high-level configuration mode; and a high level configures which mode can be used semi-statically.

During reporting the CQI, the mobile terminal needs to report a combined index related to subband indexes of M subbands selected by itself firstly. When the CQI is reported through the mobile terminal selection mode, it is defined:

$$\binom{x}{y} = \begin{cases} \binom{x}{y}, & x \geq y \\ 0, & x < y, \end{cases}$$

where $$\binom{x}{y}$$

represents a combination number extracting y elements from x different elements, $$\binom{x}{y} = \frac{x!}{y!(x-y)!};$$

the mobile terminal reports a combined index $$r = \sum_{i=0}^{M-1} \binom{N-s_i}{M-i}$$

to an Evolved Node B (eNB), wherein N represents the number of subbands of a downlink system, and M represents the number of subbands selected by the mobile terminal; and a set $\{s_i\}_{i=0}^{M-1}$ comprising M subband indexes sorted in ascending order, i.e., subband indexes of M subbands, wherein $1 \leq s_i \leq N$, and $s_i < s_{i+1}$.

At present, the subband index can be determined by the combined index with reference to a direct table lookup method, which specifically is:

an eNB obtains possible values of M and N according to a formula N=downlink system bandwidth/subband size as well as a correspondence table of downlink system bandwidth, subband size and M; calculates all possible values of r and each value of $s_i$ corresponding to different values of r according to definition above and the possible values of M and N; generates and stores a lookup table comprising each possible value of each r and $\{s_i\}_{i=0}^{M-1}$ corresponding to that each possible value according to the result of the calculation; after receiving a r reported by the mobile terminal, the eNB inquires the stored lookup table to obtain $\{s_i\}_{i=0}^{M-1}$ corresponding to the received r, that is, the subband indexes of M subbands, wherein the correspondence table of downlink system bandwidth, subband size and the number of the subbands that can be selected by the mobile terminal is shown in Table 1.

Wherein the possible values of r are within a range from 0 to $$\left(\binom{N}{M}\right) - 1,$$

and each possible value of r corresponds to $\{s_i\}_{i=0}^{M-1}$, it can be seen that there is a great amount of data contained in the lookup table. Therefore, when the direct table lookup method is used to determine a subband index, a large storage space is needed for storing a lookup table, which cause an increase in the hardware cost of the eNB.

TABLE 1

| Downlink system bandwidth | Subband size | The number of subbands that can be selected by a mobile terminal |
|---|---|---|
| 6-7 | NA | NA |
| 8-10 | 2 | 1 |
| 11-26 | 2 | 3 |
| 27-63 | 3 | 5 |
| 64-110 | 4 | 6 |

SUMMARY

In view of this, it is a main object of the present invention to provide a method and device for determining a subband index which are capable of reducing the storage space that need to be occupied for determining the subband index.

In order to achieve the above-mentioned object, the technical scheme of the present invention is realized as follows.

A method for determining a subband index, comprises: generating and storing an intermediate value table in advance according to possible values of M and N, the method further comprises:

an Evolved Node B (eNB) receives r, calculates a difference between the received r and a $$\binom{N-s_i}{M-i}$$

corresponding to each obtained subband index, searches sequences $$\binom{N-1}{M-i}, \binom{N-2}{M-i}, \ldots, \binom{0}{M-i}$$

in the stored intermediate value table according to the calculated difference to obtain each $s_i$, which constitutes $\{s_i\}_{i=0}^{M-1}$.

where i=0, 1, ..., (M−1); N represents the number of subbands of a downlink system, M represents the number of subbands selected by a mobile terminal, r represents a combined index, and $\{s_i\}_{i=0}^{M-1}$ represents at comprising M subband indexes sorted in ascending order.

The method may further comprise, prior to calculating the difference, determining whether the received combined index is greater than or equal to 0 but smaller than or equal to $$\binom{N}{M} - 1.$$

The method may further comprise, prior to the eNB receives the combined index, the mobile terminal reports the combined index to the eNB.

Generating the intermediate value table in advance according to possible values of M and N may specifically comprise:

plugging the possible values of M and N in $$\binom{N-h}{M-i}$$

to calculate the values of $$\binom{N-h}{M-i},$$

and respectively sorting, according to the ascending order of h, each value of $$\binom{N-h}{M-i}$$

that are gained by calculating on the condition that the values of M, N and i are all the same so as to obtain each sequence of $$\binom{N-1}{M-i}, \binom{N-2}{M-i}, \ldots, \binom{0}{M-i}$$

that are respectively corresponding to different values of M, N and i; and storing the each sequence to obtain the intermediate value table;

where h=0, 1, ..., N.

The method may further comprise, after generating the intermediate value table, taking N, M and i as indexes of the intermediate value table.

Obtaining each $s_i$ may specifically comprise:

A1: initializing k=0, then my_r=r, wherein my_r refers to the difference between the received r and the $$\binom{N-s_i}{M-i}$$

corresponding to each obtained subband index;

B1: searching the first value that is not greater than the current my_r from left to right in the sequences $$\binom{N-1}{M-k}, \binom{N-2}{M-k}, \ldots, \binom{0}{M-k}$$

of the stored intermediate value table, marking the searched value as $$\binom{N-j}{M-k},$$

and taking j as an obtained subband index $s_k$, and

C1: setting $$my\_r = my\_r - \binom{N-j}{M-k}$$

and k=k+1, regarding a set of the obtained subband indexes as $\{s_i\}_{i=0}^{k}$ and regarding the $$\binom{N-s_i}{M-i}$$

corresponding to each element in $\{s_i\}_{i=0}^{k}$ as $$\left\{\binom{N-s_i}{M-i}\right\}_{i=0}^{k},$$

returning to execute step B1 until k is greater than (M−1), and then ending the subband index determination flow of this time.

Obtaining each $s_i$ may specifically comprise:

A2: initializing k=0, then my_r=r, wherein my_r refers to the difference between the received r and the $$\binom{N-s_i}{M-i}$$

corresponding to each obtained subband index;

B2: searching the last value that is not greater than the current my_r from right to left in the sequences $$\binom{N-1}{M-k}, \binom{N-2}{M-k}, \ldots, \binom{0}{M-k}$$

of the stored intermediate value table, marking the searched value as $$\binom{N-j}{M-k},$$

and taking j as an obtained subband index $s_k$, and

C2: setting $$my\_r = my\_r - \binom{N-j}{M-k}$$

and k=k+1, regarding a set of the obtained subband indexes as $\{s_i\}_{i=0}^{k}$ and regarding the $$\binom{N-s_i}{M-i}$$

corresponding to each element in $\{s_i\}_{i=0}^{k}$ as $$\left\{\binom{N-s_i}{M-i}\right\}_{i=0}^{k},$$

returning to execute step B2 until k is greater than (M−1), and then ending the subband index determination flow of this time.

A device for determining a subband index, comprises: a table generation module, a receiving module and a processing module, wherein the table generation module is used for generating and storing an intermediate value table according to possible values of M and N;

the receiving module is used for receiving r; and the processing module is used for calculating a difference between the received r and $$\binom{N-s_i}{M-i}$$

corresponding to each obtained subband index, and searching sequences $$\binom{N-1}{M-i}, \binom{N-2}{M-i}, \ldots, \binom{0}{M-i}$$

in the stored intermediate value table according to the calculated difference to obtain each $s_i$, which constitutes $\{s_i\}_{i=0}^{M-1}$;

wherein i=0, 1, . . . , (M−1); N represents the number of subbands of a downlink system, M represents the number of subbands selected by a mobile terminal, r represents a combined index, and $\{s_i\}_{i=0}^{M-1}$ represents a set comprising M subband indexes sorted in ascending order.

The table generation module may comprise a first calculation module and a first storage module, wherein the first calculation module is used for plugging the possible values of M and N in $$\binom{N-h}{M-i};$$

and respectively sorting, according to the ascending order of h, each value of $$\binom{N-h}{M-i}$$

that are gained by calculating on the condition that the values of M, N and i are all the same so as to obtain each sequence of $$\binom{N-1}{M-i}, \binom{N-2}{M-i}, \ldots, \binom{0}{M-i}$$

that are respectively corresponding to different values of M, N and i; and the first storage module is used for storing the obtained sequences as the intermediate value table.

The processing module may comprise an initialization module, a searching module, a second storage module and a second calculation module, wherein the initialization module is used for initializing k=0, then my_r=r, and sending the result of the initialization to the searching module, wherein my_r refers to the difference between the received r and the $$\binom{N-s_i}{M-i}$$

corresponding to each obtained subband index, and r represents a combined index;

the searching module is used for searching the first value that is not greater than the current my_r from left to right in the sequences $$\binom{N-1}{M-k}, \binom{N-2}{M-k}, \ldots, \binom{0}{M-k}$$

of the stored intermediate value table, marking the searched value as $$\binom{N-j}{M-k},$$

and sending j to the second storage module as an obtained subband index $s_k$, and sending the current my_r and $$\binom{N-j}{M-k}$$

to the second calculation module; or searching the last value that is not greater than the current my_r from right to left in the sequences $$\binom{N-1}{M-k}, \binom{N-2}{M-k}, \ldots, \binom{0}{M-k}$$

of the stored intermediate value table, marking the searched value as $$\binom{N-j}{M-k},$$

and taking j as an obtained subband index $s_k$;

the second storage module is used for storing each obtained $s_k$ that constitutes $\{s_i\}_{i=0}^{k}$, and each $s_i$ stored in the second storage module constitutes $\{s_i\}_{i=0}^{M-1}$ until k is greater than (M−1); and the second calculation module is used for setting $$my\_r = my\_r - \binom{N-j}{M-k}$$

and k=k+1, and returning my_r and k to the searching module, and then ending the flow until k is greater than (M−1).

The processing module may further comprise a judging module which is used for triggering the initialization module when the received combined index is greater than or equal to 0 but smaller than or equal to $$\binom{N}{M} - 1.$$

By calculating the difference between the received combined index and the $$\binom{N-s_i}{M-i}$$

corresponding to each obtained subband index, searching the sequences $$\binom{N-1}{M-i}, \binom{N-2}{M-i}, \ldots, \binom{0}{M-i}$$

in the stored intermediate value table according to the calculated difference to obtain each $s_i$, the subband index determining method and device provided in the present invention only need to store the sequences $$\binom{N-1}{M-i}, \binom{N-2}{M-i}, \ldots, \binom{0}{M-i}$$

under different i in the intermediate value table when the values of M and N are specified, so as to reduce the storage space that need to be occupied for determining a subband index and lower the hardware cost of the eNB.

DETAILED DESCRIPTION

Figure 1:
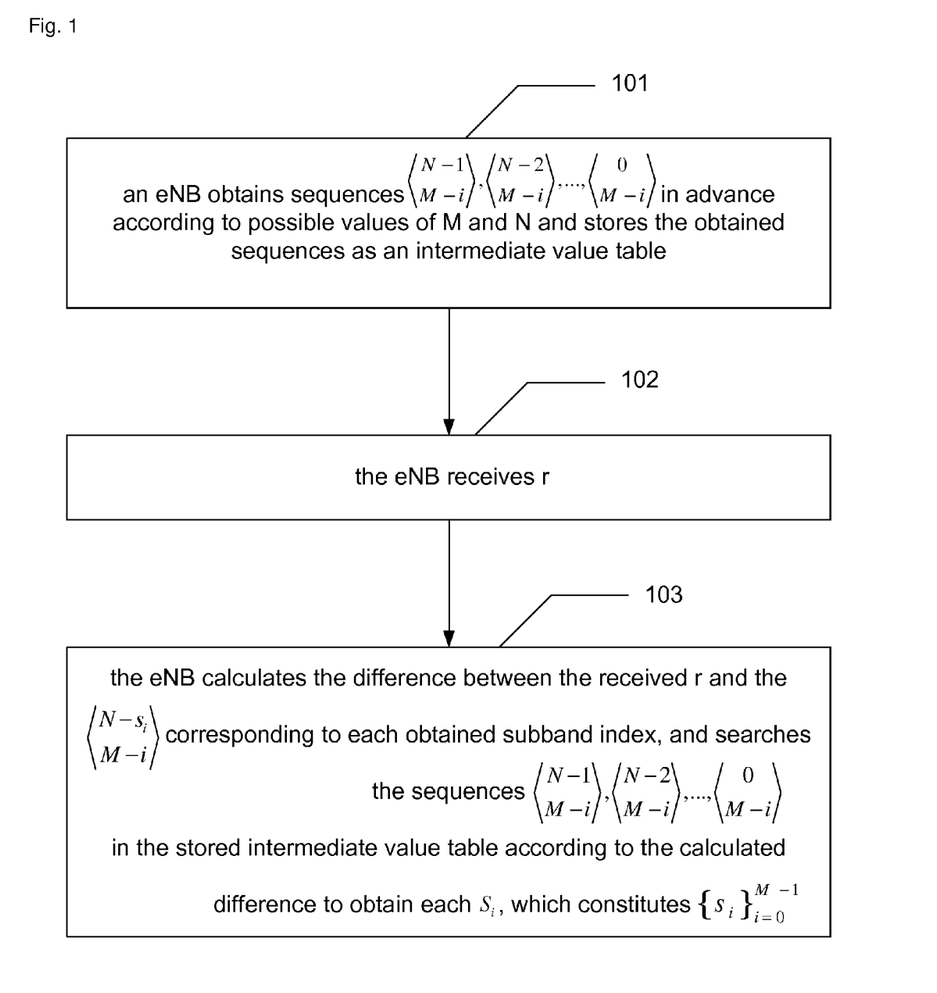
FIG. 1 is a realization flowchart illustrating a method for reporting a subband index according to an embodiment of the present invention.

The realization flowchart of a subband index determining method of an embodiment in the present invention is shown in FIG. 1, the method comprises the following steps.

Step 101: an eNB obtains sequences $$\binom{N-1}{M-i}, \binom{N-2}{M-i}, \ldots, \binom{0}{M-i}$$

in advance according to possible values of M and N and stores the obtained sequences as an intermediate value table.

Wherein the specific generation and storage method is as follows:

plugging the possible values of M and N in $$\binom{N-h}{M-i}$$

to calculate the values of $$\binom{N-h}{M-i},$$

and respectively sorting, according to the ascending order of h, each value of $$\binom{N-h}{M-i}$$

that are gained by calculating on the condition that the values of M, N and i are all the same so as to obtain each sequence of $$\binom{N-1}{M-i}, \binom{N-2}{M-i}, \ldots, \binom{0}{M-i}$$

that are respectively corresponding to different values of M, N and i; and storing the each sequence to obtain the intermediate value table;

where i=0, 1, . . . , (M−1), h=0, 1, . . . , N; N represents the number of subbands of a downlink system, M represents the number of subbands selected by a mobile terminal, and possible values of M and N can be obtained according to a formula N=downlink system bandwidth/subband size and a correspondence table of the downlink system bandwidth, subband size and M;

here, N, M and i can be taken as indexes of the intermediate value table to represent each value in the intermediate value table as the value gained by calculating when the values of M, N and i are all the same.

Step 102: the eNB receives r; wherein r is a combined index;

here, prior to step 102, further comprising: a mobile terminal reports the combined index to the eNB.

Step 103: the eNB calculates the difference between the received r and the $$\binom{N-s_i}{M-i}$$

corresponding to each obtained subband index, and searches the sequences $$\binom{N-1}{M-i}, \binom{N-2}{M-i}, \ldots, \binom{0}{M-i}$$

in the stored intermediate value table according to the calculated difference to obtain each $s_i$, which constitutes $\{s_i\}_{i=0}^{M-1}$;

where $i=0, 1, \ldots, (M-1)$; N represents the number of subbands of a downlink system, M represents the number of subbands selected by a mobile terminal, and $\{s_i\}_{i=0}^{M-1}$ represents a set comprising M subband indexes in ascending order.

The step of obtaining each $s_i$ specifically is as follows.

Step A1: initializing k=0, then my_r=r;
wherein my_r refers to the difference between the received r and the $$\binom{N-s_i}{M-i}$$

corresponding to each obtained subband index; when k=0, because no subband index is obtained, then my_r=r.

Step B1: searching the first value that is not greater than the current my_r from left to right in the sequences $$\binom{N-1}{M-k}, \binom{N-2}{M-k}, \ldots, \binom{0}{M-k}$$

of the stored intermediate value table, marking the searched value as $$\binom{N-j}{M-k},$$

and taking j as an obtained subband index $s_k$;
wherein the values of N and M in the sequences $$\binom{N-1}{M-k}, \binom{N-2}{M-k}, \ldots, \binom{0}{M-k}$$

are respectively equal to the number of subbands of the current downlink system and the number of subbands selected by the mobile terminal, that is, respectively equal to the values of N and M of received r that a UE gained by calculating.

Step C1: setting $$my\_r = my\_r - \binom{N-j}{M-k}$$

and k=k+1, returning to execute step B1 until k is greater than (M−1) to complete the current subband index determination, and then ending the subband index determination flow of this time;

here, the set of the obtained subband indexes is represented as $\{s_i\}_{i=0}^{k}$ when k=k+1, the $$\binom{N-s_i}{M-i}$$

corresponding to each element in $\{s_i\}_{i=0}^{k}$ is represented as $$\left\{\binom{N-s_i}{M-i}\right\}_{i=0}^{k},$$

and my_r refers to the difference between the received r and the $$\binom{N-s_i}{M-i}$$

corresponding to each obtained subband index, which is represented as $$my\_r = r - \sum_{i=0}^{k}\binom{N-s_i}{M-i}.$$

Here, the particular step of obtaining each $s_i$ may also be as follows.

Step A2: initializing k=0, then my_r=r, wherein my_r refers to the difference between the received r and the $$\binom{N-s_i}{M-i}$$

corresponding to each obtained subband index;

Step B2: searching the last value that is not greater than the current my_r from right to left in the sequences $$\binom{N-1}{M-k}, \binom{N-2}{M-k}, \ldots, \binom{0}{M-k}$$

of the stored intermediate value table, marking the searched value as $$\binom{N-j}{M-k},$$

and taking j as an obtained subband index $s_k$; and

Step C2: setting $$my\_r = my\_r - \binom{N-j}{M-k}$$

and k=k+1, regarding the set of the obtained subband indexes as $\{s_i\}_{i=0}^{k}$ and regarding the $$\binom{N-s_i}{M-i}$$

corresponding to each element in $$\{s_i\}_{i=0}^{k} \text{ as } \left\{\binom{N-s_i}{M-i}\right\}_{i=0}^{k},$$

returning to execute step B2 until k is greater than (M−1), and then ending the subband index determination flow of this time;

here, prior to step 103, further comprising: determining whether the received combined index is greater than or equal to 0 but smaller than or equal to $$\binom{N}{M} - 1;$$

if yes, executing step 103; otherwise, reporting an abnormality to end the subband index determination flow of this time.

Further, the intermediate value table may be released after the subband index determination flow of this time is ended when memory resource is insufficient, and a new intermediate value table is regenerated in the next subband index determination flow.

Figure 2:
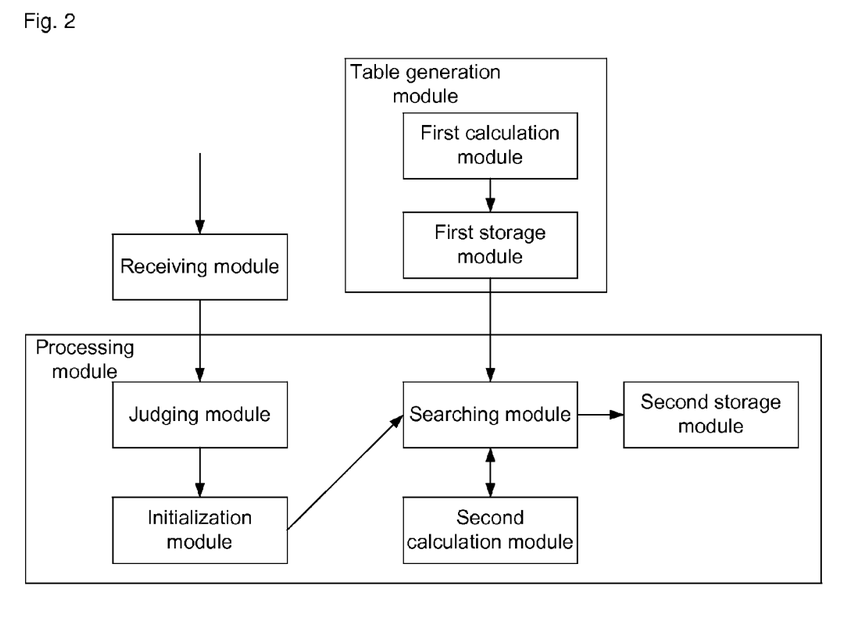
FIG. 2 is a structural schematic diagram illustrating a device for reporting a subband index according to an embodiment of the present invention.

The structure of a subband index reporting device in an embodiment of the present invention comprises, as shown in FIG. 2, a table generation module, a receiving module and a processing module, wherein the table generation module is used for obtaining sequences $$\binom{N-1}{M-i}, \binom{N-2}{M-i}, \ldots, \binom{0}{M-i}$$

according to possible values of M and N and storing the gained sequences as an intermediate value table;

the receiving module is used for receiving r;

the processing module is used for calculating the difference between the received r and the $$\binom{N-s_i}{M-i}$$

corresponding to each obtained subband index, and searching the sequences $$\binom{N-1}{M-i}, \binom{N-2}{M-i}, \ldots, \binom{0}{M-i}$$

in the stored intermediate value table according to the calculated difference to obtain each $s_i$, which constitutes $\{s_i\}_{i=0}^{M-1}$;

wherein i=0, 1, . . . , (M−1); N represents the number of subbands of a downlink system, M represents the number of subbands selected by a mobile terminal, r represents a combined index, and $\{s_i\}_{i=0}^{M-1}$ represents a set comprising M subband indexes sorted in ascending order.

Wherein, the table generation module comprises a first calculation module and a first storage module, wherein the first calculation module is used for plugging the possible values of M and N in $$\binom{N-h}{M-i}$$

to calculate the values of $$\binom{N-h}{M-i},$$

and respectively sorting, according to the ascending order of h, each value of $$\binom{N-h}{M-i}$$

that are gained by calculating on the condition that the values of M, N and i are all the same so as to obtain each sequence of $$\binom{N-1}{M-i}, \binom{N-2}{M-i}, \ldots, \binom{0}{M-i}$$

that are respectively corresponding to different values of M, N and i; and the first storage module is used for storing the obtained sequences as the intermediate value table.

Further, the processing module comprises an initialization module, a searching module, a second storage module and a second calculation module, wherein the initialization module is used for initializing k=0, then my_r=r, and sending the result of the initialization to the searching module, wherein my_r refers to the difference between the received r and the $$\binom{N-s_i}{M-i}$$

corresponding to each obtained subband index, and r represents a combined index;

the searching module is used for searching the first value that is not greater than the current my_r from left to right in the sequences $$\binom{N-1}{M-k}, \binom{N-2}{M-k}, \cdots, \binom{0}{M-k}$$

of the stored intermediate value table, marking the searched value as $$\binom{N-j}{M-k},$$

sending j to the second storage module as an obtained subband index $s_k$, and sending the current my_r and $$\binom{N-j}{M-k}$$

to the second calculation module; or searching the last value that is not greater than the current my_r from right to left in the sequences $$\binom{N-1}{M-k}, \binom{N-2}{M-k}, \cdots, \binom{0}{M-k}$$

of the stored intermediate value table, marking the searched value as $$\binom{N-j}{M-k},$$

and taking j as an obtained subband index $s_k$;

the second storage module is used for storing each obtained $s_k$ which constitutes $\{s_i\}_{i=0}^{k}$ and each $s_i$ stored in the second storage module constitutes $\{s_i\}_{i=0}^{M-1}$ until k is greater than (M−1); and the second calculation module is used for setting $$my\_r = my\_r - \binom{N-j}{M-k}$$

and k=k+1, and returning my_r and k to the searching module, and then ending the flow until k is greater than (M−1).

The above-mentioned $$\binom{N-s_i}{M-i}$$

corresponding to each element in the $\{s_i\}_{i=0}^{k}$ is $$\left\{\binom{N-s_i}{M-i}\right\}_{i=0}^{k}.$$

The processing module further comprises a judging module which is used for triggering the initialization module when the received combined index is greater than or equal to 0 but smaller or equal to $$\binom{N}{M} - 1.$$

The above are only preferred embodiments of the present invention but not limitation to the protection scope of the present invention.

What is claimed is:

1. A method for determining a subband index, generating and storing an intermediate value table in advance according to possible values of M and N, the method further comprising:

an Evolved Node B (eNB) receiving r, calculating a difference between the received r and a $$\binom{N-s_i}{M-i}$$

corresponding to each obtained subband index, searching sequences $$\binom{N-1}{M-i}, \binom{N-2}{M-i}, \cdots, \binom{0}{M-i},$$

in the stored intermediate value table according to the calculated difference to obtain each $s_i$, which constituting $\{s_i\}_{i=0}^{M-1}$;

where i=0, 1, . . . , (M−1); N represents the number of subbands of a downlink system, M represents the number of subbands selected by a mobile terminal, r represents a combined index, and $\{s_i\}_{i=0}^{M-1}$ represents a set comprising M subband indexes sorted in ascending order.

2. The method for determining a subband index according to claim 1, further comprising, prior to calculating the difference, determining whether the received combined index is greater than or equal to 0 but smaller than or equal to $$\binom{N}{M} - 1.$$

3. The method for determining a subband index according to claim 2, further comprising, prior to the eNB receiving the combined index, the mobile terminal reporting the combined index to the eNB.

4. The method for determining a subband index according to claim 2, wherein generating the intermediate value table in advance according to possible values of M and N specifically comprises:

plugging the possible values of M and N in $$\binom{N-h}{M-i}$$

to calculate the values of $$\binom{N-h}{M-i},$$

and respectively sorting, according to the ascending order of h, each value of $$\binom{N-h}{M-i}$$

that are gained by calculating on the condition that the values of M, N and i are all the same so as to obtain each sequence of $$\binom{N-1}{M-i}, \binom{N-2}{M-i}, \ldots, \binom{0}{M-i}$$

that are respectively corresponding to different values of M, N and i; and storing the each sequence to obtain the intermediate value table;

where h=0, 1, ..., N.

5. The method for determining a subband index according to claim 4, further comprising, after generating the intermediate value table, taking N, M and i as indexes of the intermediate value table.

6. The method for determining a subband index according to claim 1, further comprising, prior to the eNB receiving the combined index, the mobile terminal reporting the combined index to the eNB.

7. The method for determining a subband index according to claim 1, wherein generating the intermediate value table in advance according to possible values of M and N specifically comprises:

plugging the possible values of M and N in $$\binom{N-h}{M-i}$$

to calculate the values of $$\binom{N-h}{M-i},$$

and respectively sorting, according to the ascending order of h, each value of $$\binom{N-h}{M-i}$$

that are gained by calculating on the condition that the values of M, N and i are all the same so as to obtain each sequence of $$\binom{N-1}{M-i}, \binom{N-2}{M-i}, \ldots, \binom{0}{M-i}$$

that are respectively corresponding to different values of M, N and i; and storing the each sequence to obtain the intermediate value table;

where h=0, 1, ..., N.

8. The method for determining a subband index according to claim 7, further comprising, after generating the intermediate value table, taking N, M and i as indexes of the intermediate value table.

9. The method for determining a subband index according to claim 1, wherein obtaining each $S_i$ specifically comprises:

A1: initializing k=0, then my_r=r, wherein my_r refers to the difference between the received r and the $$\binom{N-s_i}{M-i}$$

corresponding to each obtained subband index;

B1: searching the first value that is not greater than the current my_r from left to right in the sequences $$\binom{N-1}{M-k}, \binom{N-2}{M-k}, \ldots, \binom{0}{M-k}$$

of the stored intermediate value table, marking the searched value as $$\binom{N-j}{M-k},$$

and taking j as an obtained subband index $s_k$; and

C1: setting $$my\_r = my\_r - \binom{N-j}{M-k}$$

and k=k+1, regarding a set of the obtained subband indexes as $\{s_i\}_{i=0}^{k}$ and regarding the $$\binom{N-s_i}{M-i}$$

corresponding to each element in $$\{s_i\}_{i=0}^{k} \text{ as } \left\{\binom{N-s_i}{M-i}\right\}_{i=0}^{k},$$

returning to execute step B1 until k is greater than (M−1), and then ending the subband index determination flow of this time.

10. The method for determining a subband index according to claim 1, wherein obtaining each $s_i$ specifically comprises:

A2: initializing k=0, then my_r=r, wherein my_r refers to the difference between the received r and $$\binom{N-s_i}{M-i}$$

the corresponding to each obtained subband index;

B2: searching the last value that is not greater than the current my_r from right to left in the sequences of $$\binom{N-1}{M-k}, \binom{N-2}{M-k}, \ldots, \binom{0}{M-k}$$

the stored intermediate value table, marking the searched value as $$\binom{N-j}{M-k},$$

and taking j as an obtained subband index $s_k$; and

C2: setting $$my\_r = my\_r - \binom{N-j}{M-k}$$

and k=k+1, regarding a set of the obtained subband indexes as $\{s_i\}_{i=0}^{k}$ and regarding the $$\binom{N-s_i}{M-i}$$

corresponding to each element in $\{S_i\}_{i=0}^{k}$ as $$\left\{\binom{N-s_i}{M-i}\right\}_{i=0}^{k},$$

returning to execute step B2 until k is greater than (M−1), and then ending the subband index determination flow of this time.

11. A device for determining a subband index, comprising: a table generation module, a receiving module and a processing module, wherein
the table generation module is used for generating and storing an intermediate value table according to possible values of M and N;
the receiving module is used for receiving r; and
the processing module is used for calculating a difference between the received r and $$\binom{N-s_i}{M-i}$$

corresponding to each obtained subband index, and searching sequences $$\binom{N-1}{M-i}, \binom{N-2}{M-i}, \ldots, \binom{0}{M-i}$$

in the stored intermediate value table according to the calculated difference to obtain each $s_i$, which constitutes $\{S_i\}_{i=0}^{M-1}$;

wherein i=0, 1, . . . , (M−1); N represents the number of subbands of a downlink system, M represents the number of subbands selected by a mobile terminal, r represents a combined index, and $\{s_i\}_{i=0}^{M-1}$ represents a set comprising M subband indexes sorted in ascending order.

12. The device for determining a subband index according to claim 11, wherein the table generation module comprises a first calculation module and a first storage module, wherein
the first calculation module is used for plugging the possible values of M and N in $$\binom{N-h}{M-i};$$

and respectively sorting, according to the ascending order of h, each value of $$\binom{N-h}{M-i}$$

that are gained by calculating on the condition that the values of M, N and i are all the same so as to obtain each sequence of $$\binom{N-1}{M-i}, \binom{N-2}{M-i}, \ldots, \binom{0}{M-i}$$

that are respectively corresponding to different values of M, N and i; and
the first storage module is used for storing the obtained sequences as the intermediate value table.

13. The device for determining a subband index according to claim 12, wherein the processing module comprises an initialization module, a searching module, a second storage module and a second calculation module, wherein
the initialization module is used for initializing k=0, then my_r=r, and sending the result of the initialization to the searching module, wherein my_r refers to the difference between the received r and $$\binom{N-s_i}{M-i}$$

corresponding to each obtained subband index, and r represents a combined index;

the searching module is used for searching the first value that is not greater than the current my_r from left to right in the sequences $$\binom{N-1}{M-k}, \binom{N-2}{M-k}, \ldots, \binom{0}{M-k}$$

of the stored intermediate value table, marking the searched value as $$\binom{N-j}{M-k},$$

and sending j to the second storage module as an obtained subband index $s_k$, and sending the current my_r and $$\binom{N-j}{M-k}$$

to the second calculation module; or searching the last value that is not greater than the current my_r from right to left in the sequences $$\binom{N-1}{M-k}, \binom{N-2}{M-k}, \ldots, \binom{0}{M-k}$$

of the stored intermediate value table, marking the searched value as $$\binom{N-j}{M-k},$$

and taking j as an obtained subband index $s_k$;
the second storage module is used for storing each obtained $s_k$ that constitutes $\{s_i\}_{i=0}^{k}$, and each $s_i$ stored in the second storage module constitutes $\{s_i\}_{i=0}^{M-1}$ until k is greater than (M-1); and
the second calculation module is used for setting $$my\_r = my\_r - \binom{N-j}{M-k}$$

and k=k+1, and returning my_r and k to the searching module, and then ending the flow until k is greater than (M-1).

14. The device for determining a subband index according to claim 13, wherein the processing module further comprises a judging module which is used for triggering the initialization module when the received combined index is greater than or equal to 0 but smaller than or equal to $$\binom{N}{M} - 1.$$

15. The device for determining a subband index according to claim 11, wherein the processing module comprises an initialization module, a searching module, a second storage module and a second calculation module, wherein the initialization module is used for initializing k=0, then my_r=r, and sending the result of the initialization to the searching module, wherein my_r refers to the difference between the received r and the $$\binom{N-s_i}{M-i}$$

corresponding to each obtained subband index, and r represents a combined index;
the searching module is used for searching the first value that is not greater than the current my_r from left to right in the sequences $$\binom{N-1}{M-k}, \binom{N-2}{M-k}, \ldots, \binom{0}{M-k}$$

of the stored intermediate value table, marking the searched value as $$\binom{N-j}{M-k},$$

and sending j to the second storage module as an obtained subband index $s_k$, and sending the current my_r and $$\binom{N-j}{M-k}$$

to the second calculation module; or searching the last value that is not greater than the current my_r from right to left in the sequences $$\binom{N-1}{M-k}, \binom{N-2}{M-k}, \ldots, \binom{0}{M-k}$$

of the stored intermediate value table, marking the searched value as $$\binom{N-j}{M-k},$$

and taking j as an obtained subband index $s_k$;
the second storage module is used for storing each obtained $s_k$ that constitutes $\{s_i\}_{i=0}^{k}$, and each $s_i$ stored in the second storage module constitutes $\{s_i\}_{i=0}^{M-1}$ until k is greater than (M-1); and
the second calculation module is used for setting $$my\_r = my\_r - \binom{N-j}{M-k}$$

and k=k+1, and returning my_r and k to the searching module, and then ending the flow until k is greater than (M-1).

16. The device for determining a subband index according to claim 15, wherein the processing module further comprises a judging module which is used for triggering the initialization module when the received combined index is greater than or equal to 0 but smaller than or equal to $\binom{N}{M} - 1$.

* * * * *